United States Patent
Diefenbaugh et al.

(10) Patent No.: US 9,367,116 B2
(45) Date of Patent: Jun. 14, 2016

(54) APPARATUS TO REDUCE IDLE LINK POWER IN A PLATFORM

(71) Applicant: Intel Corporation, Santa Clara, CA (US)

(72) Inventors: Paul S. Diefenbaugh, Portland, OR (US); Robert E. Gough, Sherwood, OR (US); Yuval Bachrach, Haifa (IL); Mikal C. Hunsaker, El Dorado Hills, CA (US); Rafi Ben-Tal, Yokneam (IL); Ilan Pardo, Ramat-Hasharon (IL); Gideon Prat, Haifa (IL); David J. Harriman, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/978,340

(22) Filed: Dec. 22, 2015

(65) Prior Publication Data

US 2016/0109925 A1      Apr. 21, 2016

Related U.S. Application Data

(63) Continuation of application No. 14/148,530, filed on Jan. 6, 2014, which is a continuation of application No. 13/175,574, filed on Jul. 1, 2011, now Pat. No. 8,689,028.

(51) Int. Cl.
*G06F 1/26* (2006.01)
*G06F 1/32* (2006.01)

(52) U.S. Cl.
CPC .............. *G06F 1/3206* (2013.01); *G06F 1/325* (2013.01); *G06F 1/3234* (2013.01); *G06F 1/3287* (2013.01)

(58) Field of Classification Search
CPC ..... G06F 1/3206; G06F 1/3234; G06F 1/325; G06F 1/3278; G06F 1/3287; Y02B 60/126; Y02B 60/1282

See application file for complete search history.

(56) References Cited

U.S. PATENT DOCUMENTS 5,617,418 A * 4/1997 Shirani ................... H04L 12/44
                                                        370/402
6,000,035 A   12/1999 Matsushima et al.
(Continued)

FOREIGN PATENT DOCUMENTS

KR     10-0229575     11/1999
KR   10-2009-0017643    2/2009
(Continued)

OTHER PUBLICATIONS

Preliminary Rejection received in Korean Patent Application No. 2013-7034875, mailed on Dec. 30, 2014, 3 pages of English translation, 5 pages of Preliminary Rejection in Korean.
(Continued)

*Primary Examiner* — Mark Connolly
(74) *Attorney, Agent, or Firm* — Patent Capital Group

(57) ABSTRACT

A system on a chip (SoC) is provided including processing cores and a root complex. The transaction requests are communicated between a root port of the root complex and a device, the root port including electrical idle (EI) exit detect circuitry and a reference clock source. The root port supports a first link state, in which the reference clock source and EI exit detect circuitry of the root port are disabled but a common mode voltage is maintained, and a second link state, in which the reference clock source and EI exit detect circuitry are disabled and the common mode voltage is not maintained. The root port transitions to the first link state based on a service latency requirement of the device being less than a threshold and to the second link state based on the service latency requirement being greater than or equal to the threshold.

8 Claims, 6 Drawing Sheets

(56) References Cited

U.S. PATENT DOCUMENTS

| | | | |
|---|---|---|---|
| 7,188,263 | B1 | 3/2007 | Rubinstein et al. |
| 8,255,713 | B2 * | 8/2012 | Jeyaseelan .............. G06F 1/325 |
| | | | 713/300 |
| 8,275,560 | B2 | 9/2012 | Radhakrishnan et al. |
| 8,689,028 | B2 | 4/2014 | Diefenbaugh et al. |
| 2006/0034611 | A1 | 2/2006 | Li |
| 2009/0249103 | A1 | 10/2009 | Jeyaseelan et al. |
| 2010/0169684 | A1 | 7/2010 | Jeyaseelan et al. |
| 2011/0047395 | A1 | 2/2011 | Kwa et al. |
| 2011/0060931 | A1 | 3/2011 | Radhakrishnan et al. |
| 2012/0324265 | A1 | 12/2012 | Jeyaseelan et al. |
| 2014/0310543 | A1 | 10/2014 | Diefenbaugh et al. |

FOREIGN PATENT DOCUMENTS

| | | |
|---|---|---|
| WO | WO 2005/066765 | 7/2005 |
| WO | WO 2013/006535 A1 | 1/2013 |

OTHER PUBLICATIONS

International Search Report and Written Opinion for PCT Patent Application No. PCT/US2012/045206 mailed Dec. 10, 2012, 9 pages.

International Preliminary Report on Patentability and Written Opinion received for PCT Patent application No. PCT/US2012/045206, mailed on Jan. 16, 2014, 6 pages.

Supplementary Partial European Search Report in EP Application No. 12 80 7775, mailed on Oct. 27, 2015, 10 pages.

"Energy-Efficient Platforms, White Paper, Designing Devices Using the New Power Management Extension for Interconnects," Intel, Revision 1.0, Jul. 2009, 38 pages.

Budruk, Ravi et al., "Passage—PCI Express System Architecture," PCI Express System Architecture, Addison-Wesley, US, Sep. 4, 2003, 48 pages.

* cited by examiner

APPARATUS TO REDUCE IDLE LINK POWER IN A PLATFORM

This application claims the benefit of priority to U.S. patent application Ser. No. 14/148,530, filed Jan. 6, 2014, which claims the benefit of priority to U.S. patent application Ser. No. 13/175,574, filed Jul. 1, 2011 (now issued as U.S. Pat. No. 8,689,028), each of which are hereby incorporated by reference in their entirety herein.

FIELD OF THE INVENTION

This invention relates to a platform, and more specifically but not exclusively, to a method and apparatus to reduce the idle link power in a platform.

BACKGROUND DESCRIPTION

High speed serial communication links are often used in a platform to provide fast data access. However, these high speed serial communication links often require high idle power. In power sensitive platforms such as handheld and tablet computers, high speed serial communication links may not be suitable due to the high idle power requirements.

BRIEF DESCRIPTION OF THE DRAWINGS

The features and advantages of embodiments of the invention will become apparent from the following detailed description of the subject matter in which.

DETAILED DESCRIPTION

Figure 1:
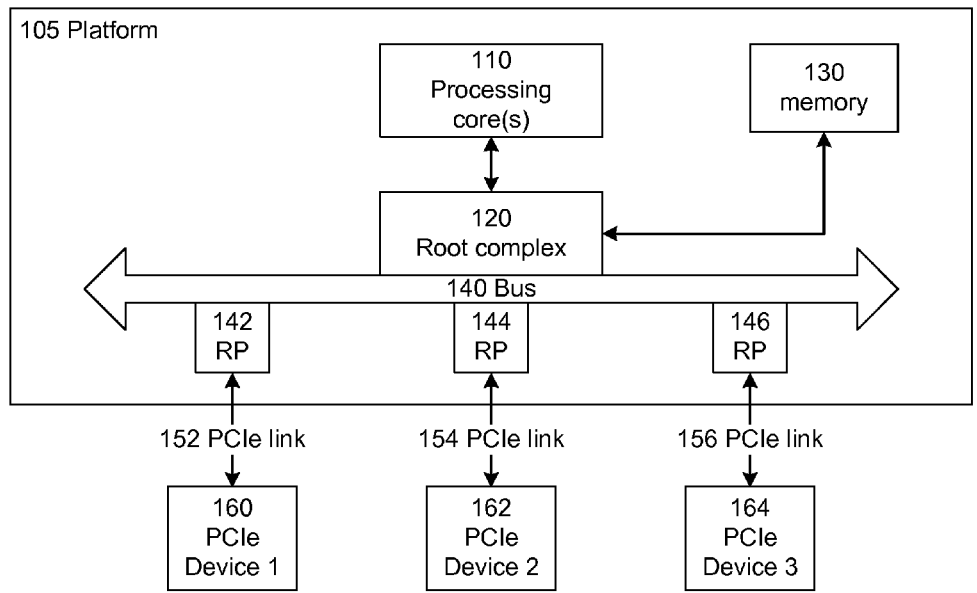
FIG. 1 illustrates a block diagram of a platform in accordance with one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements.

Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

The terms "upstream" and "downstream" are used to illustrate the direction of the traffic or data flow in the platform in one embodiment of the invention and are not meant to be limiting. The terms "upstream" and "downstream" may be interchanged in another embodiment of the invention. Other terminology to describe the direction of the traffic or data flow in the platform can be used without affecting the workings of the invention.

Embodiments of the invention provide a method and apparatus to reduce the idle power in a platform. In one embodiment of the invention, the host and its coupled endpoint(s) in the platform each has a low power idle link state(s) that allows disabling of the high speed link circuitry in both the host and its coupled endpoint(s). This allows the platform to reduce its idle link power as both the host and its coupled endpoint(s) are able to turn off their high speed link circuitry in one embodiment of the invention. The disabling of the high speed link circuitry includes, but is not limited to, power gating of the voltage input(s), shutting off the input clock(s) and any other technique to reduce the power consumption of the high speed link circuitry.

In one embodiment of the invention, the low power idle link state is a sub-state of an existing low power link state. In another embodiment of the invention, the low power idle link is added as a new link state of the platform. The platform includes, but is not limited to, a desktop computer, a laptop computer, a netbook computer, a handheld computer, a tablet computer, a notebook computer, a personal digital assistant (PDA), a server, a workstation, a cellular telephone, a smartphone, a mobile computing device, an Internet appliance or any other type of computing device.

FIG. 1 illustrates a block diagram 100 of a platform 105 in accordance with one embodiment of the invention. In one embodiment of the invention, the platform 105 is compliant at least in part with the Peripheral Component Interconnect (PCI) Express (PCIe) standard or specification maintained by the PCI Special Interest Group (PCI-SIG). In one embodiment of the invention, the platform is compliant at least in part with the power states of the advanced configuration and power interface specification (ACPI standard, "Advanced Configuration and Power Interface Specification", Revision 4.0a, published Apr. 5 2010). In another embodiment of the invention, the platform is compliant at least in part with earlier and/or future revisions of the ACPI standard.

In one embodiment of the invention, the platform 105 has a processing core(s) 110 coupled to a Root Complex 120. The Root Complex 120 is coupled with a bus 140, and a memory 130 and supports three Root Ports 142, 144 and 146. The Root Ports 142, 144 and 146 are coupled with the PCIe endpoint devices 1-3 160, 162 and 164 respectively via the PCIe communication links 152, 154, and 156. In one embodiment of the invention, each of the Root Ports 142, 144 and 146 has a upstream port that is coupled with the respective downstream port of the PCIe endpoint devices 1-3 160, 162 and 164.

In one embodiment of the invention, the Root Complex 120 generates transaction requests on behalf of the processor core(s) 110. In one embodiment of the invention, the Root Complex 120 is integrated with the processing core 120. In another embodiment of the invention, the Root Complex 120 supports more than three Root Ports. In yet another embodiment of the invention, the Root Complex 120 supports less than three Root Ports.

In one embodiment of the invention, each of the Root Ports 142, 144 and 146 and their respective PCIe endpoint devices 1-3 160, 162 and 164 supports a low power idle link state that allows disabling of their high speed circuitry. Each of the Root Ports 142, 144 and 146 and their respective PCIe endpoint devices 1-3 160, 162 and 164 can initiate an entry or transition to the low power idle link state by sending an indication in one embodiment of the invention.

In one embodiment of the invention, a side band signal between the Root Port and its coupled PCIe endpoint device is used for the indication whether the platform 105 is to transition to the low power idle link state. For example, in one embodiment of the invention, a side band signal which already exists in each connection pair in the platform 105 is repurposed or reconfigured as the indication whether the platform 105 is to transition to the low power idle link state. Since no new pins are required when the existing side band signal are repurposed, there is very low incremental cost to support the low power idle link state. The side band signal includes, but is not limited to, the CLKREQ# signal, the WAKE# signal, a reserved signal and any other signal that can be repurposed without affecting the communication between the Root Port and its coupled PCIe endpoint device.

In another embodiment of the invention, an out of band signal between the Root Port and its coupled PCIe endpoint device is used for the indication whether the platform 105 is to transition to the low power idle link state. The out of band signal includes, but is not limited to, the system management bus (SMBus), Inter-IC (I2C) Bus or any other communication protocol.

FIG. 1 is not meant to be limiting and serves only as one embodiment of the invention that is compliant at least in part with the PCIe standard. One of ordinary skill in the relevant art will readily appreciate how to adapt the workings of the invention to other high speed serial communication protocols and shall not be described herein.

Figure 2:
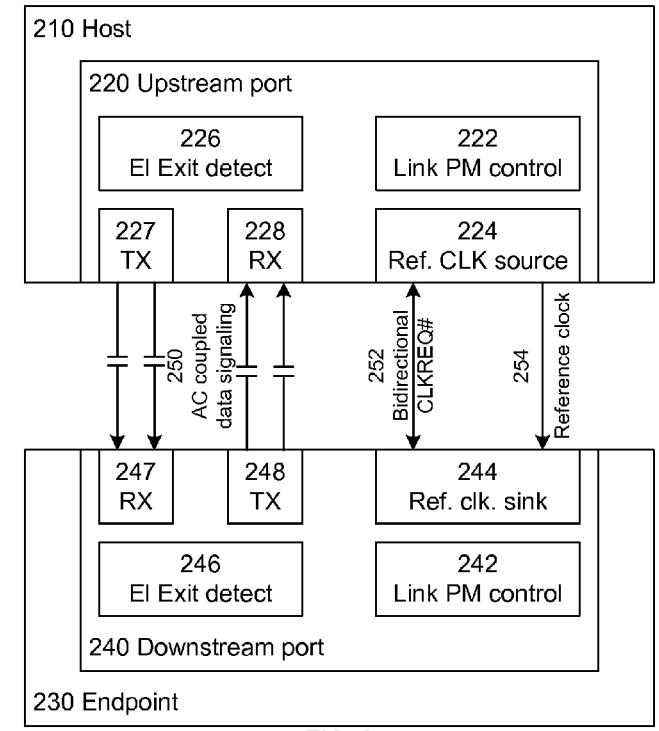
FIG. 2 illustrates a block diagram of a host device and an endpoint device in accordance with one embodiment of the invention.

FIG. 2 illustrates a block diagram 200 of a host device 210 and an endpoint device 230 in accordance with one embodiment of the invention. For clarity of illustration, the host device 210 and the endpoint device 230 are illustrated as being compliant at least in part with the PCIe standard. FIG. 2 illustrates how the clock request (CLKREQ#) signal (not shown in FIG. 2) which is an unidirectional open drain signal from the host device 210 to the endpoint device 230 is repurposed as a bidirectional open drain signal clock request (CLKREQ#) signal 252 in one embodiment of the invention. In one embodiment of the invention, both host device 210 and the endpoint device 230 use the bidirectional CLKREQ# signal 252 to indicate that it wants to enter the low power idle state.

The host device 210 has an upstream port 220 that is communicatively coupled with the downstream port 240 in the endpoint device 230 in one embodiment of the invention. The upstream port 220 has a link Power Management (PM) control logic 222, an Electrical Idle (EI) exit detect circuitry 226, a Reference Clock (CLK) source 224, a Transmitter (TX) circuit 227, and a Receiver (RX) circuit 228 in one embodiment of the invention. The downstream port 240 has a link Power Management (PM) control logic 242, an Electrical Idle (EI) exit detect circuitry 246, a Reference Clock (CLK) sink 244, a Transmitter circuit 248, and a Receiver (RX) circuit 247 in one embodiment of the invention.

The Reference CLK source 224 of the upstream port 220 is coupled with the Reference CLK sink 244 via the bidirectional CLKREQ# signal 252 and the reference clock signal 254. The Alternating Current (AC) coupled data signaling 250 illustrates the AC common mode differential signaling between the TX circuit 227 of the upstream port 220 and the RX circuit 247 of the downstream port 240, and the AC common mode differential signaling between the TX circuit 248 of the downstream port 240 and the RX circuit 228 of the upstream port 220.

The high speed link circuitry of each of the upstream port 220 and the downstream port 240 includes, but is not limited to, the TX circuit, the RX circuit, the phase lock loop(s) (PLLs), and any other circuitry or logic required for the high speed communication between the upstream port 220 and the downstream port 240.

In one embodiment of the invention, the high speed link circuitry can be disabled when the upstream port 220 and the downstream port 240 enter the low power idle link state. For example, in one embodiment of the invention, the PLL(s) in the reference CLK source 224 in the upstream port 220 is disabled in the low power idle link state. In one embodiment of the invention, the TX circuit 227 and RX circuit 228 in the upstream port 220 and the TX circuit 248 and RX circuit 247 in the downstream port 240 are disabled in the low power idle link state.

In another embodiment of the invention, the AC common mode differential signaling between the TX circuit 227 of the upstream port 220 and the RX circuit 247 of the downstream port 240 and the AC common mode differential signaling between the TX circuit 248 of the downstream port 240 and the RX circuit 228 of the upstream port 220 are disabled in the low power idle link state.

Different combinations of disabling the various components in the host device 210 and the endpoint device 230 in the low power idle link state can be used in one embodiment of the invention. In one embodiment of the invention, the low power idle link state is defined as a sub state of the Link Training Status State Machine (LTSSM). In one embodiment of the invention, two sub states, link 1 off (L1.OFF) link state, and link 1 snooze (L1.SNOOZ) link state are defined.

In the L1.OFF link state, the TX circuit, RX circuit, PLL(s) and the AC common mode keepers of the high speed link circuitry are fully power gated or disabled in one embodiment of the invention. In the L1.SNOOZ link state, the TX circuit, RX circuit, PLL(s) of the high speed link circuitry are fully power gated or disabled but the AC common mode keepers of the high speed link circuitry are enabled to maintain the AC common mode voltages of the differential signaling in one embodiment of the invention.

In FIG. 2, for clarity of illustration, it is assumed that it is possible for the RX and TX circuits and the PLL(s) associated with the port to be power gated while all the port context is maintained in one embodiment of the invention. If it is not possible for the RX and TX circuits and the PLL(s) associated with the port to maintain all the port context when they are power gated or disabled, one of ordinary skill in the relevant art will readily appreciate how to add additional logic to maintain all the port context when the RX and TX circuits and the PLL(s) associated with the port are disabled and it shall not be described herein.

Figure 3:
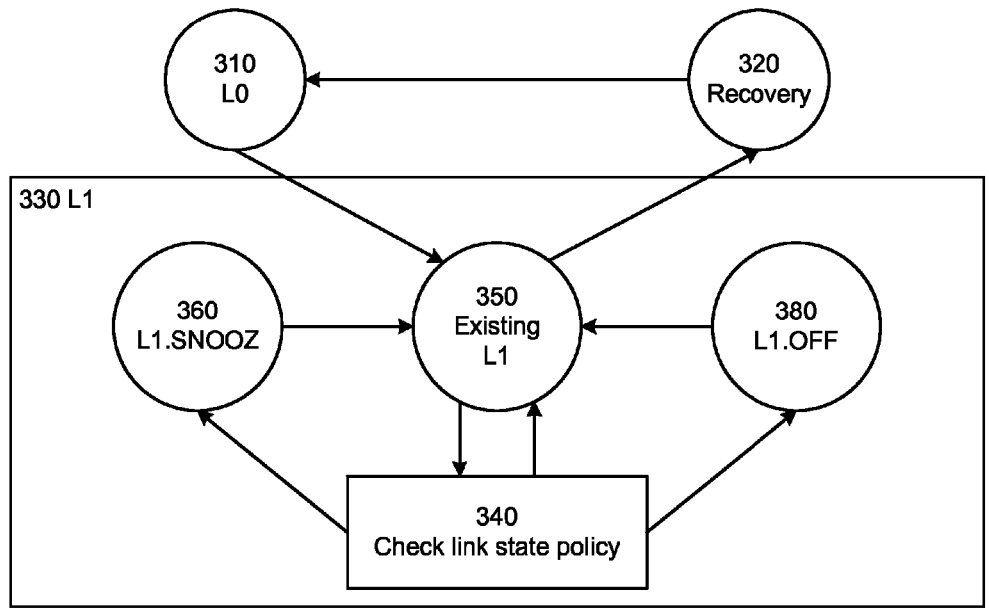
FIG. 3 illustrates a block diagram of the link states in accordance with one embodiment of the invention.

FIG. 3 illustrates a block diagram 300 of the link states in accordance with one embodiment of the invention. For clarity of illustration, FIG. 3 is discussed with reference to FIG. 2. The link state L1 330 illustrates one embodiment of the invention where it has two low power idle sub states: L1.OFF link state 380, and L1.SNOOZ link state 360 in one embodiment of the invention.

The L0 link state 310 is the normal operational state where the data and control packets can be transmitted and received. All power management states are entered from the L0 link state 310 in one embodiment of the invention. When a power management L1 link state request is received, the platform transitions to the L1 link state 330. The existing L1 link state 350 is the L1 state as defined in the LTSSM. In one embodiment of the invention, the platform transitions to the existing L1 link state 350 to maintain all the port context.

In one embodiment of the invention, the platform checks the link state policy in step 340 to determine whether it should remain in the existing L1 link state 350 or transition to L1.SNOOZ link state 360 or the L1.OFF link state 380. The link state policy is based on, but not limited to, the service latency requirement of the up/downstream port, and the idle duration information about the up/downstream port. In one embodiment of the invention, the link state policy of the host or upstream port dynamically determines which of the low power idle states to enter. The link state policy of the endpoint device or downstream port determines the guidelines and constraints to send to the host or upstream port in one embodiment of the invention.

For example, in one embodiment of the invention, both the Root Port and the endpoint device support Latency Tolerance Reporting (LTR). In one embodiment of the invention, the Root Port in the upstream port receives a LTR message from the endpoint device. In another embodiment of the invention, the endpoint device receives a LTR message from the Root Port in the upstream port.

The LTR message includes, but is not limited to, the service latency requirement of the up/downstream port. In one embodiment of the invention, the link state policy of the Root Port uses the last advertised service latency requirement of the downstream port. In another embodiment of the invention, the link state policy of the downstream port uses the last advertised service latency requirement of the Root Port.

In another embodiment of the invention, the estimated or projected idle duration is used by the link state policy to determine which low power idle link state to enter. For example, in one embodiment of the invention, when the link state policy determines that the idle duration is short, it sets or keeps the platform at the existing L1 link state 350. When the link state policy determines that the idle duration is long, it transitions the platform to the L1.OFF link state 380 or L1.SNOOZ link state 360 based on the service latency requirement in one embodiment of the invention.

In one embodiment of the invention, the platform has the ability to detect and enable the low power idle link states in the upstream port and the endpoint device. For example, in one embodiment of the invention, both the upstream port and the endpoint device have configuration registers to indicate whether it supports the low power idle link states. In another embodiment of the invention, the upstream port and the endpoint device use boot strapping to indicate whether the low power idle link states are supported. In yet another embodiment of the invention, the upstream port and the endpoint device use a non-volatile storage or memory to indicate whether the low power idle link states are supported. One of ordinary skill in the relevant art will readily appreciate how to use other methods of enabling the low power idle link states and it shall not described herein.

In one embodiment of the invention, in step 340, the platform checks if the service latency requirement of the downstream port received from the LTR is greater than a threshold LTR_L1OFF_THRESHOLD and if the L1.OFF link state 380 is enabled. In another embodiment of the invention, in step 340, the platform checks if the service latency requirement of the upstream port received from the LTR is greater than a threshold LTR_L1OFF_THRESHOLD and if the L1.OFF link state 380 is enabled. In one embodiment of the invention, the LTR_L1OFF_THRESHOLD is stored in a register in the root port and the endpoint device.

If both the service latency requirement of the up/downstream port received from the LTR is greater than the threshold LTR_L1OFF_THRESHOLD and the L1.OFF link state 380 is enabled, the platform transitions to the L1.OFF link state 380. The platform transitions to the L1.OFF link state 380 to achieve the greatest power savings by disabling all the high speed link circuitry in one embodiment of the invention.

If either the service latency requirement of the up/downstream port received from the LTR is less than the threshold LTR_L1OFF_THRESHOLD or the L1.OFF link 380 is not enabled, the platform transitions to the L1.SNOOZ link state 360.

In one embodiment of the invention, the L1.SNOOZ link state 360 offers an intermediate power benefit as the TX circuit, RX circuit, PLL(s) of the high speed link circuitry are fully power gated or disabled but the AC common mode keepers of the high speed link circuitry are enabled to maintain the AC common mode voltages of the differential signaling. By maintaining the AC common mode voltages of the differential signaling, the L1.SNOOZ link state 360 needs shorter exit latency compared to the L1.OFF link state 380. The L1.OFF link state 360 needs longer exit latency as it is required to reestablish the AC common voltages of the differential signaling in one embodiment of the invention.

The L1.SNOOZ link state 360 transitions to the recovery link state 320 via the existing L1 link state 350 in one embodiment of the invention. The L1.OFF link state 380 transitions to the recovery link state 320 via the existing L1 link state 350 in one embodiment of the invention. The Recovery link state 320 allows both the Transmitter and Receiver to send and receive data in one embodiment of the invention. The Recovery link state 320 also allows a configured link to change the speed data rate of operation if desired, re-establish bit lock, symbol lock or block alignment, and Lane-to-Lane de-skew.

Figure 4:
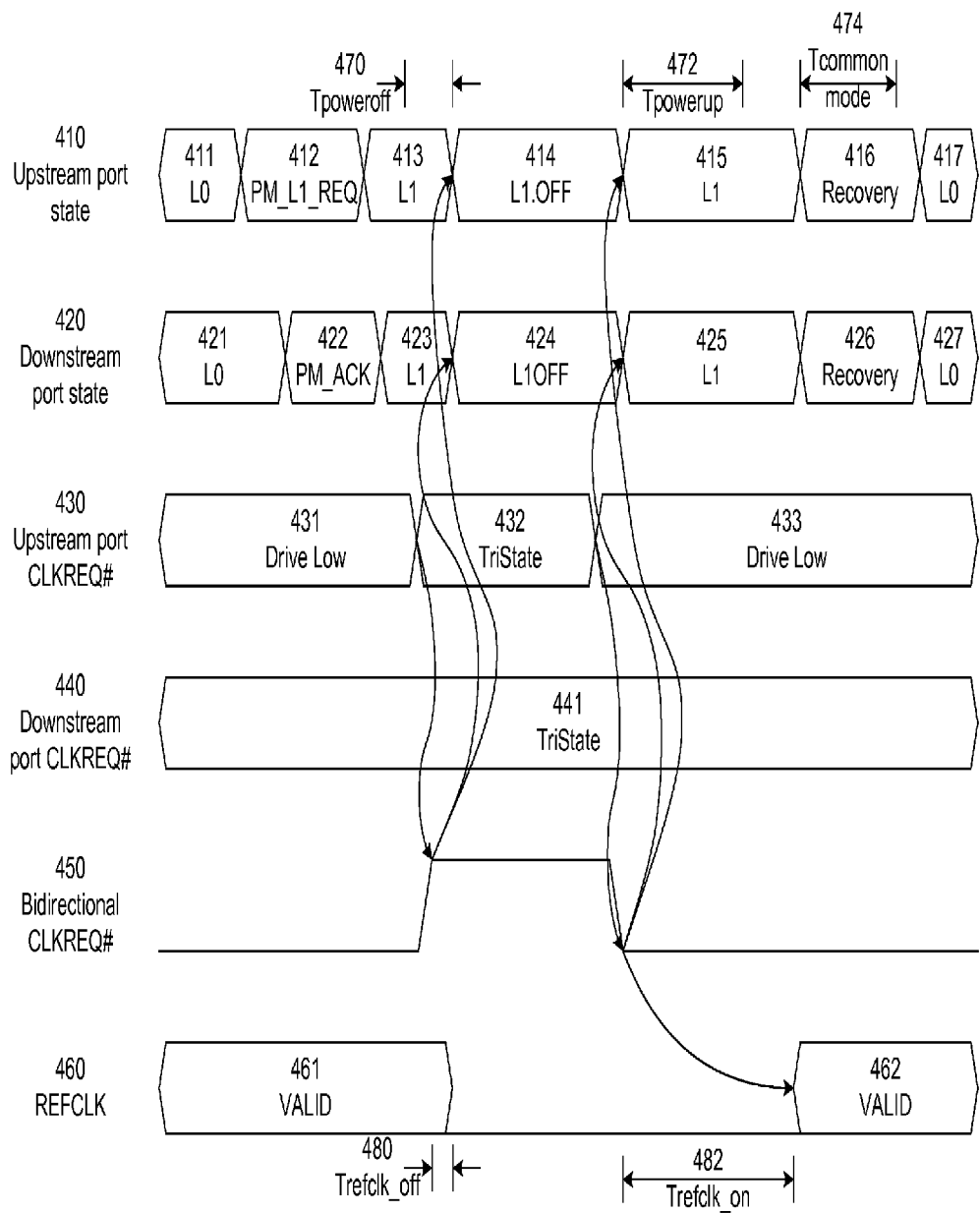
FIG. 4 illustrates a timing diagram of an upstream port initiated link state exit in accordance with one embodiment of the invention.

FIG. 4 illustrates a timing diagram or flow 400 of an upstream port initiated link state exit in accordance with one embodiment of the invention. For clarity of illustration, FIG. 4 is discussed with reference to FIG. 3. FIG. 4 illustrates the transition from the L0 link state 310, the existing L1 link state 350, the L1.OFF link state 380, the existing L1 link state 350, the recovery link state 320 and back to the L0 link state 310. In FIG. 4, for clarity of illustration, it is assumed that both the service latency requirement of the downstream port received from the LTR is greater than the threshold LTR_L1OFF_THRESHOLD and the L1.OFF link state is enabled.

FIG. 4 illustrates the upstream port state 410, the downstream port state 420, the upstream port CLKREQ# signal 430, the downstream port CLKREQ# signal 440, the bidirectional CLKREQ# signal 450, and the reference clock (REFCLK) 460. The CLKREQ# signal 450 is a bidirectional open drain signal that is coupled between the upstream port and the downstream port in one embodiment of the invention.

The upstream port CLKREQ# signal 430 shows the signal driven the upstream port on the bidirectional CLKREQ# signal 450. The downstream port CLKREQ# signal 440 shows the signal driven the downstream port on the CLKREQ# signal 450. In one embodiment of the invention, the bidirectional CLKREQ# signal 450 is coupled with a pull-up resistor that pulls the bidirectional CLKREQ# signal 450 to a logic one voltage when the upstream port and the downstream port are not driving the bidirectional CLKREQ# signal 450 low.

At the start of the flow 400, the upstream port state 410 and the downstream port state 420 are in the L0 link state 411 and 421 respectively. The upstream port sends a Power Management L1 state transition request (PM_L1_REQ) 412 to the downstream port and transitions to the existing L1 link state 413 in preparation for entering the L1.OFF link state 414. In one embodiment of the invention, the existing L1 link state 413 maintains all port context. The downstream port receives the PM_L1_REQ 412 and sends a PM acknowledgement (PM_ACK) 422 to the upstream port. The downstream port transitions to the L1 link state 423 in one embodiment of the invention.

The downstream port does not drive the downstream port CLKREQ# signal 440, i.e., the signal is left floating or at a tristate level. The upstream port drives or keeps the upstream port CLKREQ# signal 430 low as illustrated by the signal 431. When the upstream port is in the existing L1 link state 413, the upstream port initiates the transition to the L1.OFF link state 414 by de-asserting the upstream port CLKREQ# signal 430 as illustrated by the tristate signal 432.

The upstream and downstream ports sample the CLKREQ# signal 450 and when it determines that the CLKREQ# signal 450 is de-asserted or inactive, the upstream and downstream ports enter the L1.OFF link state 414 and 424 respectively. After waiting for a minimum Tpoweroff 470 time, the upstream and downstream ports may power gate their Physical layer (PHY) circuitry in one embodiment of the invention. When the downstream port samples that the bidirectional CLKREQ# signal 450 is inactive, it turns off the link REFCLK 460 within the time Trefclk_off 480. The REFCLK 460 is valid 461 until it is switched off in one embodiment of the invention.

If either the upstream or downstream port needs to exit the L1.OFF state, it asserts its respective CLKREQ# signal 430 and 440. In one embodiment of the invention, if the downstream port is initiating an exit from the L1.OFF link state 424, it drives the CLKREQ# signal 440 low until the link enters the L0 link state 427. If the upstream port is initiating an exit from the L1.OFF link state 414, it drives the CLKREQ# signal 430 until the link enters the recovery link state 416.

The upstream port initiates the exit from the L1.OFF link state 414 when it drives the upstream port CLKREQ# signal 430 low as illustrated by the signal 433. Both the upstream and downstream ports monitor CLKREQ# signal 450 when they are in the L1.OFF link state 414 and 424. When the upstream and downstream ports determine that the bidirectional CLKREQ# signal 450 has been asserted, they perform an exit from their L1.OFF link state and enter the L1 link state 415 and 425 respectively.

In one embodiment of the invention, the upstream and downstream ports wait for a minimum time of Tpowerup 472 before powering up their PHYs and actively driving their link interface. When the downstream port samples that the bidirectional CLKREQ# signal 450 is de-asserted, the REFCLK 460 remains gated or disable for the minimum time of Tpowerup 472. The Trefclk_on 482 illustrates the amount of time before the REFCLK 460 becomes valid 462.

In one embodiment of the invention, all the link and PHY states are maintained during the L1.OFF link state 414 and 424 and are restored upon exit from the L1.OFF link state 414 and 424. When the REFCLK 460 becomes valid 462 and their PLL(s) are locked, the upstream and downstream ports enter the recovery link state 416 and 426 respectively.

In one embodiment of the invention, the electrical state of the link during an exit from the existing L1 link state 415 and 425 may not match the PCIe standard L1 exit specification because the TX common mode was not maintained. The TX common mode is re-established by the time of exiting the recovery training sequence. In order to ensure that the TX common mode has been established prior to entering the the L0 link state 427, the downstream port LTSSM maintains a timer and does not send any TS2 Training Sequences until a minimum time of Tcommonmode 474 has elapsed since the downstream port started both transmitting and receiving TS1 Training Sequences.

Figure 5:
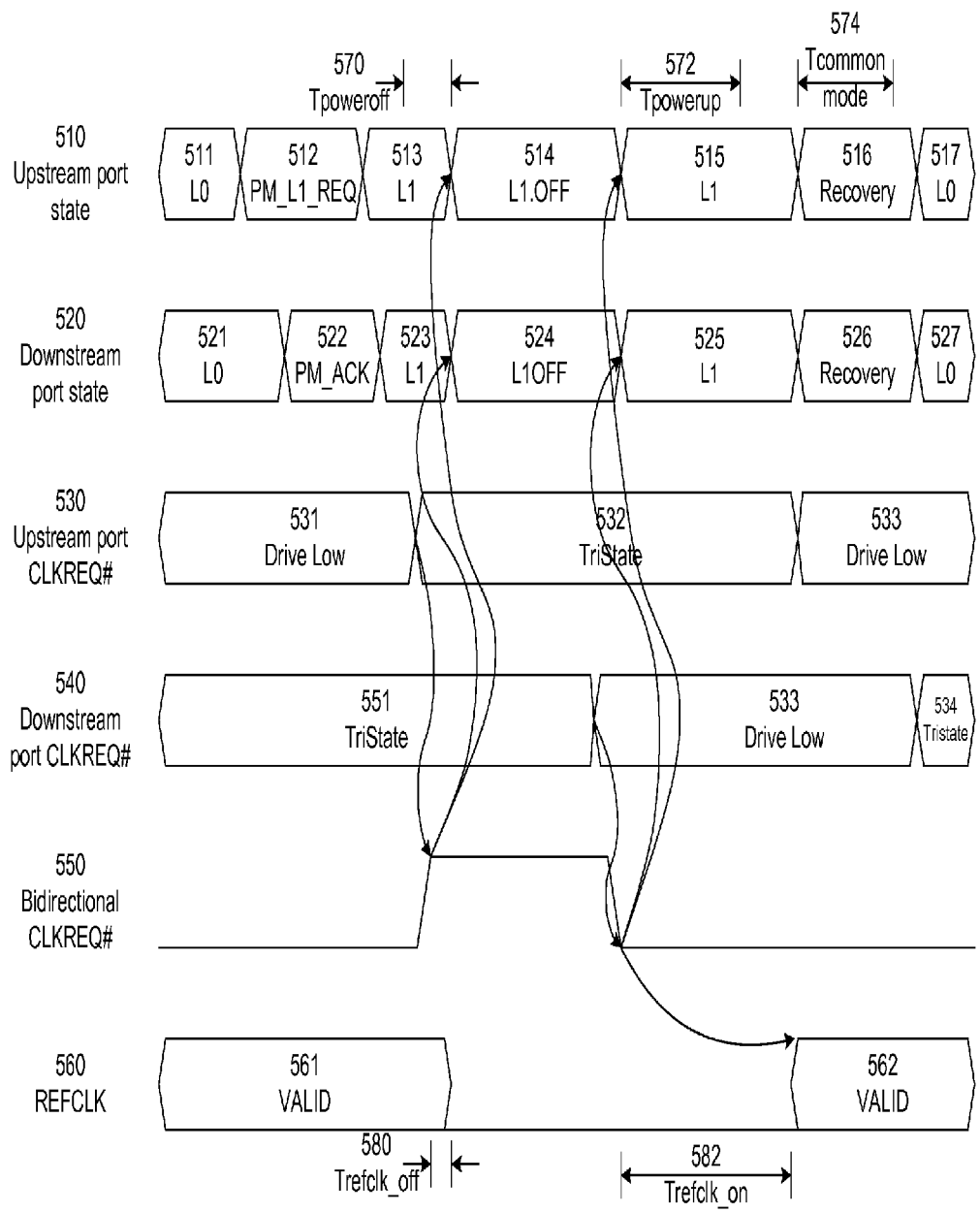
FIG. 5 illustrates a timing diagram of a downstream port initiated link state exit in accordance with one embodiment of the invention.

FIG. 5 illustrates a timing diagram or flow 500 of a downstream port initiated link state exit in accordance with one embodiment of the invention. FIG. 5 illustrates a scenario where the upstream port initiates the entry to the L1.OFF link state 514 and the downstream port initiates the exit from the L1.OFF link state 524 when it drives or asserts the downstream port CLKREQ# signal 540 low as illustrated by the signal 533. The workings of the link state transitions in FIG. 5 are similar to the workings of the link state transitions in FIG. 4 and shall not be described herein.

Figure 6:
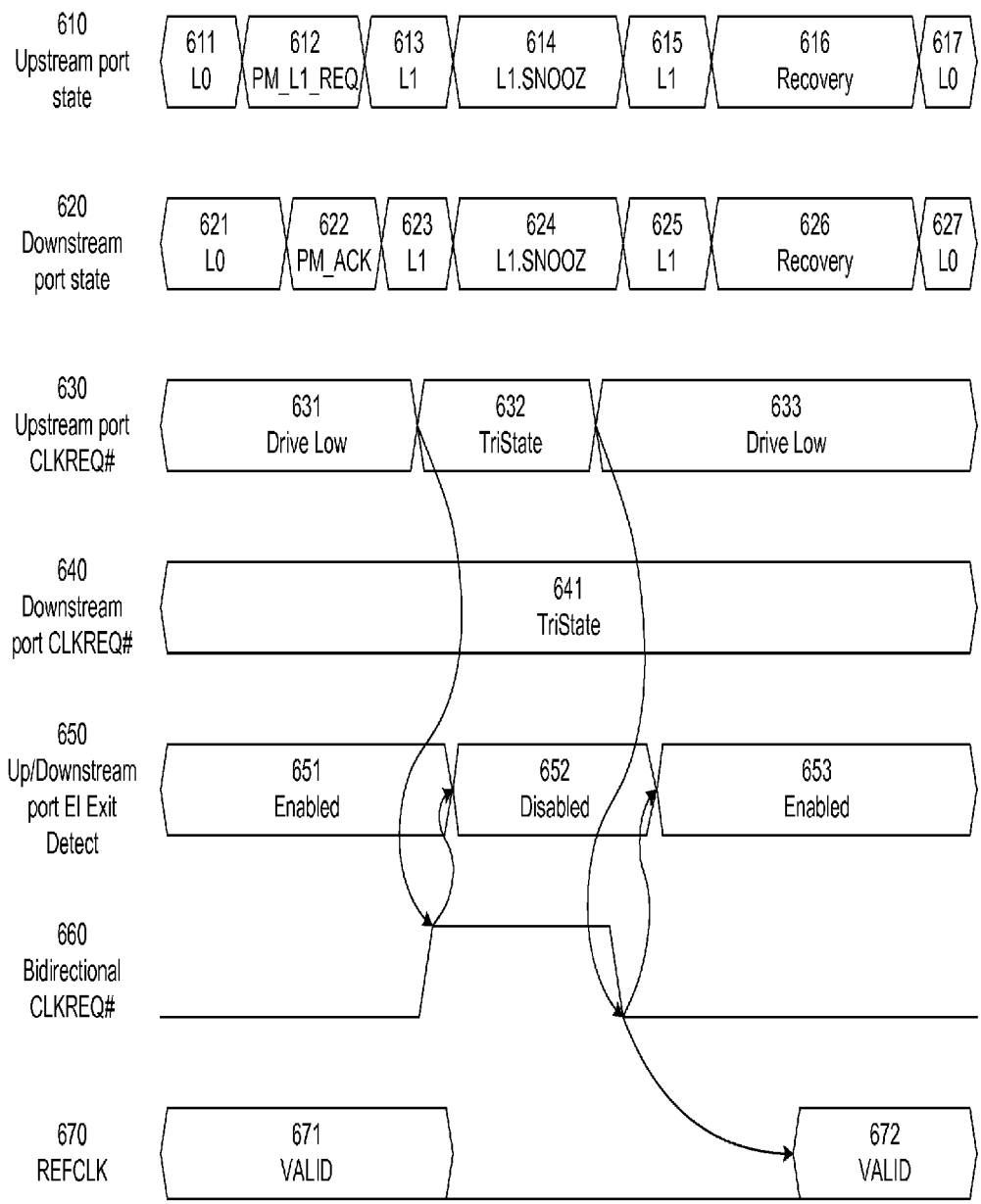
FIG. 6 illustrates a timing diagram of an upstream port initiated link state exit in accordance with one embodiment of the invention.

FIG. 6 illustrates a timing diagram or flow 600 of an upstream port initiated link state exit in accordance with one embodiment of the invention. For clarity of illustration, FIG. 6 is discussed with reference to FIG. 3. FIG. 6 illustrates the transition from the L0 link state 310, the existing L1 link state 350, the L1.SNOOZ link state 360, the existing L1 link state 350, the recovery link state 320 and back to the L0 link state 310.

The flow 600 is applicable when the service latency requirement of the up/downstream port is less than the LTR_L1OFF_THRESHOLD in one embodiment of the invention. For example, in one embodiment of the invention, the flow 600 is applicable when Max Snooped or Non-Snooped LTR value advertised by the upstream port is less than the LTR_L1OFF_THRESHOLD.

In one embodiment of the invention, the flow 600 is applicable when the L1.OFF is not enabled. In another embodiment of the invention, the platform has a L1.SNOOZ enable function and the flow 600 is applicable when the L1.SNOOZ is not enabled. The enabling feature of L1.SNOOZ link state is implemented using, but not limited to, register bits, non-volatile storage medium and the like.

FIG. 6 illustrates the upstream port state 610, the downstream port state 620, the upstream port CLKREQ# signal 630, the downstream port CLKREQ# signal 640, the Up/Downstream port EI Exit Detect signal 650, the bidirectional CLKREQ# signal 660, and the REFCLK 670.

At the start of the flow 600, the upstream port state 610 and the downstream port state 620 are in the L0 link state 611 and 621 respectively. The upstream port sends a PM_L1_REQ 612 to the downstream port and transitions to the existing L1 link state 613. The downstream port receives the PM_L1_REQ 612 and sends a PM_ACK 622 to the upstream port. The downstream port transitions to the existing L1 link state 623.

The downstream port does not drive the downstream port CLKREQ# signal 640, i.e., the signal is left floating or at a tristate level. The upstream port drives or keeps the upstream port CLKREQ# signal 630 low as illustrated by the signal 631. In the existing L1 link state 613 and 623, the link electrical state is maintained based on the PCIe specification. When the upstream port is in the existing L1 link state 613, the upstream port initiates the transition to the L1.SNOOZ link state 614 by de-asserting the upstream port CLKREQ# signal 630 as illustrated by the tristate signal 632.

When both the output driver of the upstream port CLKREQ# signal 630 and the downstream port CLKREQ# signal 640 are switched off, the pull up resistor on the bidirectional CLKREQ# signal 660 pulls the voltage on the bidirectional CLKREQ# signal 640 to logic one voltage.

The upstream and downstream ports sample the CLKREQ# signal 660 and when it determines that the CLKREQ# signal 660 is de-asserted or inactive, the upstream and downstream ports enter the L1.SNOOZ link state 614 and 624 respectively. Both upstream and downstream ports turn off their EI exit detect circuitry when they enter the L1.SNOOZ link state 614 and 624 respectively as illustrated as the signal 652 in one embodiment of the invention. In one embodiment of the invention, both upstream and downstream ports power down any active logic that is not required to maintain TX common mode voltage when they enter the L1.SNOOZ link state 614 and 624. The REFCLK may be turned off when they enter the L1.SNOOZ link state 614 and 624 in one embodiment of the invention.

If either the upstream or downstream port needs to exit the L1.SNOOZ state, it asserts their respective CLKREQ# signal 630 and 640. In one embodiment of the invention, if the downstream port is initiating an exit from the L1.SNOOZ link state 624, it drives the downstream port CLKREQ# signal 640 low until the link enters the L0 link state 627. If the upstream port is initiating an exit from the L1.SNOOZ link state 614, it drives the upstream port CLKREQ# signal 630 low until the link has passed through the L0 link state 617 and re-entered the next existing L1 link state.

The upstream port initiates the exit from the L1.SNOOZ link state 614 when it drives the upstream port CLKREQ# signal 630 low as illustrated by the signal 633. Both the upstream and downstream ports monitor CLKREQ# signal 660 when they are in the L1.SNOOZ link state 614 and 624. When the upstream and downstream ports determine that the bidirectional CLKREQ# signal 660 has been asserted, they perform an exit from the L1.SNOOZ link state and enter the existing L1 link state 615 and 625 respectively. The upstream and downstream ports enable the EI exit detect circuitry as illustrated as the signal 653 in one embodiment of the invention. The upstream port turns on its REFCLK activity detection circuit as illustrated by the valid signal 672 in one embodiment of the invention.

Figure 7:
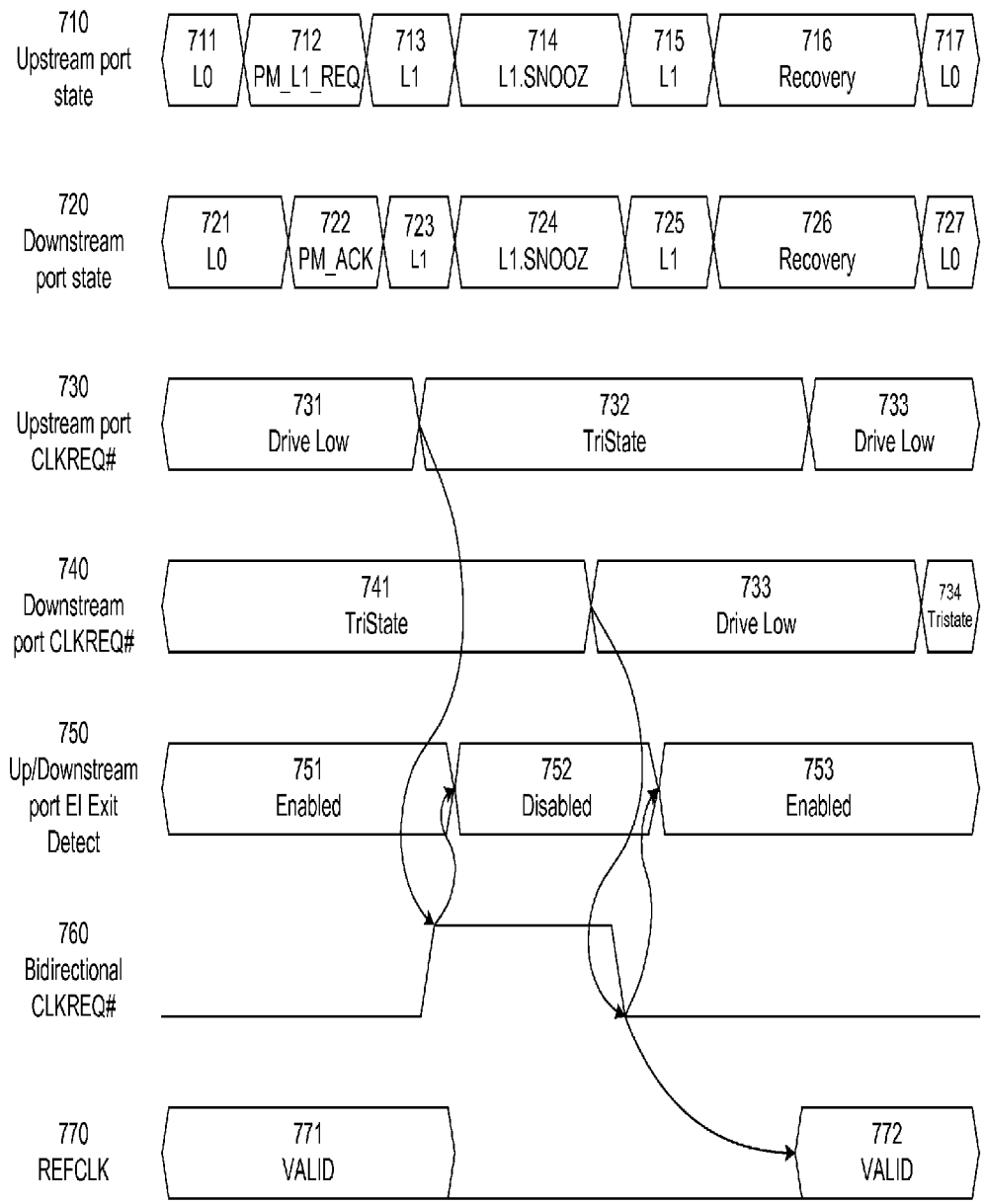
FIG. 7 illustrates a timing diagram of a downstream port initiated link state exit in accordance with one embodiment of the invention.

FIG. 7 illustrates a timing diagram or flow 700 of a downstream port initiated link state exit in accordance with one embodiment of the invention. FIG. 7 illustrates a scenario where the upstream port initiates the entry to the L1.SNOOZ link state and the downstream port initiates the exit from the L1.SNOOZ link state when it drives or asserts the downstream port CLKREQ# signal 740 low as illustrated by the signal 733. The workings of the link state transitions in FIG. 7 are similar to the workings of the link state transitions in FIG. 6 and shall not be described herein.

Figure 8:
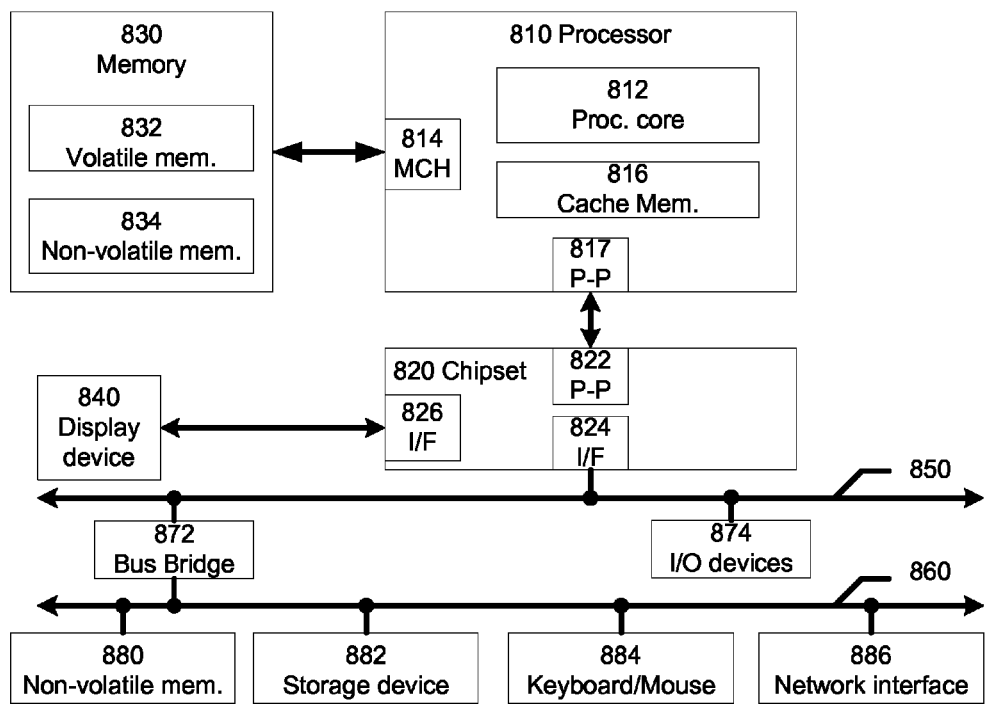
FIG. 8 illustrates a system to implement the methods disclosed herein in accordance with one embodiment of the invention.

FIG. 8 illustrates a system or platform 800 to implement the methods disclosed herein in accordance with one embodiment of the invention. The system 800 includes, but is not limited to, a desktop computer, a laptop computer, a netbook computer, a handheld computer, a tablet computer, a notebook computer, a personal digital assistant (PDA), a server, a workstation, a cellular telephone, a smartphone, a mobile computing device, an Internet appliance or any other type of computing device. In another embodiment, the system 800 used to implement the methods disclosed herein may be a system on a chip (SOC) system.

The processor 810 has a processing core 812 to execute instructions of the system 800. The processing core 812 includes, but is not limited to, pre-fetch logic to fetch instructions, decode logic to decode the instructions, execution logic to execute instructions and the like. The processor 810 has a cache memory 816 to cache instructions and/or data of the system 800. In another embodiment of the invention, the cache memory 816 includes, but is not limited to, level one, level two and level three, cache memory or any other configuration of the cache memory within the processor 810.

The memory control hub (MCH) 814 performs functions that enable the processor 810 to access and communicate with a memory 830 that includes a volatile memory 832 and/or a non-volatile memory 834. The volatile memory 832 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 834 includes, but is not limited to, NAND flash memory, phase change memory (PCM), read only memory (ROM), electrically erasable programmable read only memory (EEPROM), or any other type of non-volatile memory device.

The memory 830 stores information and instructions to be executed by the processor 810. The memory 830 may also stores temporary variables or other intermediate information while the processor 810 is executing instructions. The chipset 820 connects with the processor 810 via Point-to-Point (PtP) interfaces 817 and 822. In another embodiment of the invention, the chipset 820 is a platform control hub. The I/O subsystem is part of the platform control hub in one embodiment of the invention.

The chipset 820 enables the processor 810 to connect to other modules in the system 800. In one embodiment of the invention, the interfaces 817 and 822 operate in accordance with a PtP communication protocol such as the Intel® QuickPath Interconnect (QPI) or the like. The chipset 820 connects to a display device 840 that includes, but is not limited to, liquid crystal display (LCD), cathode ray tube (CRT) display, or any other form of visual display device.

In addition, the chipset 820 connects to one or more buses 850 and 860 that interconnect the various modules 874, 880, 882, 884, and 886. Buses 850 and 860 may be interconnected together via a bus bridge 872 if there is a mismatch in bus speed or communication protocol. The chipset 820 couples with, but is not limited to, a non-volatile memory 880, a mass storage device(s) 882, a keyboard/mouse 884 and a network interface 886. The mass storage device 882 includes, but is not limited to, a solid state drive, a hard disk drive, an universal serial bus flash memory drive, or any other form of computer data storage medium. The network interface 886 is implemented using any type of well-known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 8 are depicted as separate blocks within the system 800, the functions performed by some of these blocks may be integrated within a single semiconductor circuit or may be implemented using two or more separate integrated circuits. For example, although the cache memory 816 is depicted as a separate block within the processor 810, the cache memory 816 can be incorporated into the processor core 812 respectively. The system 800 may include more than one processor/processing core in another embodiment of the invention.

The methods disclosed herein can be implemented in hardware, software, firmware, or any other combination thereof. Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system on a chip (SoC) comprising:
   one or more processing cores; and
   a root complex coupled to the one or more processing cores to generate transaction requests on behalf of the one or more processor cores, the transaction requests to be communicated between a root port of the root complex and a device, the root port comprising electrical idle (EI) exit detect circuitry and a reference clock source, the root port having a first link state, in which the reference clock source and the EI exit detect circuitry of the root port are disabled but a common mode voltage is maintained, and a second link state, in which the reference clock source and EI exit detect circuitry of the root port are disabled and the common mode voltage is not maintained;
   wherein the root port is to transition to the first link state based on a service latency requirement of the device being less than a threshold and to the second link state based on the service latency requirement of the device being greater than or equal to the threshold.

2. The SoC of claim 1, wherein the root port further comprises link power management logic.

3. The SoC of claim 1, wherein the device is a peripheral component interconnect express (PCIe) endpoint device.

4. The SoC of claim 1, wherein the root port further comprises a transmitter and receiver.

5. The SoC of claim 4, wherein the transmitter and receiver are disabled in both, the first link state and the second link state.

6. The SoC of claim 1, further comprising a cache memory to cache instructions and/or data.

7. The SoC of claim 1, further comprising a network interface.

8. The SoC of claim 7, wherein the network interface is a wireless interface configured to operate in accordance with a wireless communication protocol.

* * * * *